United States Patent
Brown et al.

(10) Patent No.: US 9,469,428 B2
(45) Date of Patent: Oct. 18, 2016

(54) PRODUCT CONTAINER INCLUDING AN IN-MOLD LABEL

(75) Inventors: Paul Philip Brown, Ramona, CA (US); Jens Ole Sorensen, Rancho Santa Fe, CA (US)

(73) Assignee: Sorensen Research and Development Trust, San Diego, CA (US)

( * ) Notice: Subject to any disclaimer, the term of this patent is extended or adjusted under 35 U.S.C. 154(b) by 133 days.

(21) Appl. No.: 13/813,533

(22) PCT Filed: Aug. 3, 2011

(86) PCT No.: PCT/US2011/046486
§ 371 (c)(1),
(2), (4) Date: Jan. 31, 2013

(87) PCT Pub. No.: WO2012/018956
PCT Pub. Date: Feb. 9, 2012

(65) Prior Publication Data
US 2013/0125431 A1    May 23, 2013

Related U.S. Application Data

(60) Provisional application No. 61/370,296, filed on Aug. 3, 2010.

(51) Int. Cl.
*B65D 1/40* (2006.01)
*B29C 45/14* (2006.01)
(Continued)

(52) U.S. Cl.
CPC ........... *B65D 1/40* (2013.01); *B29C 45/14008* (2013.01); *B65D 1/0215* (2013.01); *B65D 23/0864* (2013.01); *B65D 35/10* (2013.01); *B65D 41/04* (2013.01); *G09F 23/00* (2013.01); *B29C 2045/14057* (2013.01);

(Continued)

(58) Field of Classification Search
CPC ............ B29C 49/2408; B65D 77/044; B65D 5/5009
USPC ............................................................ 428/9
See application file for complete search history.

(56) References Cited

U.S. PATENT DOCUMENTS 3,359,002 A * 12/1967 Wolf ............................. 473/579
3,440,748 A *  4/1969 Hackley ......................... 40/592
(Continued)

*Primary Examiner* — Shin Kim
(74) *Attorney, Agent, or Firm* — Edward W. Callan

(57) ABSTRACT

A hollow multi-layered container comprises: an outer layer including a label and an inner layer, which is injection molded. The label has a barrier material that impedes one or more substances that emanate from a product from penetrating through the label, and the label displays information related to the product. The inner layer and the barrier material of the outer layer are substantially coextensive. For a container having a sidewall and an inclined shoulder extending inward from the sidewall, the label includes a primary segment covering the sidewall of the container and a plurality of shoulder pads covering the shoulder in at least approximately contiguous alignment with adjacent said shoulder pads. A method of inserting an in-mold label for an injection molded product into the mold, comprises the steps of: (a) inserting the label partially into a cavity bounded by a cavity mold part so that one end of the label extends from the cavity; and (b) upon closing the mold, pushing the label fully into the cavity by pushing against the label with a mold part that is moved toward the cavity when the mold is closed so that when the label is fully within the cavity, the lateral edges of the label are aligned with each other.

4 Claims, 4 Drawing Sheets

(51) Int. Cl.
  *B65D 23/08* (2006.01)
  *B65D 35/10* (2006.01)
  *G09F 23/00* (2006.01)
  *B65D 1/02* (2006.01)
  *B65D 41/04* (2006.01)
  *B29L 23/20* (2006.01)
  *G09F 3/02* (2006.01)

(52) U.S. Cl.
  CPC ........... *B29C 2045/14918* (2013.01); *B29K 2995/0067* (2013.01); *B29L 2023/20* (2013.01); *G09F 2003/0273* (2013.01); *G09F 2023/0025* (2013.01)

(56) References Cited

U.S. PATENT DOCUMENTS

| | | | |
|---|---|---|---|
| 3,481,463 A * | 12/1969 | Pavlow | 206/457 |
| 3,580,473 A * | 5/1971 | Gill | 229/106 |
| 4,020,140 A | 4/1977 | Rumball | 264/261 |
| 4,126,238 A * | 11/1978 | Rausing | 215/12.2 |
| 4,402,777 A * | 9/1983 | Derbyshire | 156/86 |
| 4,572,412 A * | 2/1986 | Brach et al. | 222/527 |
| 4,595,612 A * | 6/1986 | Tavss et al. | 222/92 |
| 4,598,839 A * | 7/1986 | Dombroski et al. | 222/92 |
| 4,693,919 A * | 9/1987 | Languillat et al. | 428/34.2 |
| 5,223,315 A * | 6/1993 | Katsura et al. | 428/36.92 |
| D338,397 S * | 8/1993 | Sun et al. | D9/697 |
| 5,292,566 A * | 3/1994 | Shacklett, III | 428/40.9 |
| D353,539 S * | 12/1994 | Linner | D9/447 |
| 5,407,742 A * | 4/1995 | Tavss et al. | 428/34.2 |
| 5,656,346 A * | 8/1997 | Hirt | 428/36.91 |
| 5,962,096 A * | 10/1999 | Smith et al. | 428/35.7 |
| 6,385,878 B1 * | 5/2002 | Key | 40/306 |
| 6,405,896 B2 * | 6/2002 | Jud et al. | 222/107 |
| 6,773,653 B2 * | 8/2004 | Miller | B29C 45/14811 264/259 |
| D584,162 S * | 1/2009 | Gieux | D9/695 |
| 7,757,884 B2 * | 7/2010 | Scheifele | 220/610 |
| 7,927,674 B2 * | 4/2011 | Spaar | 428/11 |
| D648,224 S * | 11/2011 | Spence | D9/695 |
| D702,561 S * | 4/2014 | Fournier et al. | D9/695 |
| 8,968,618 B2 * | 3/2015 | Shapiro et al. | 264/266 |
| 2002/0124945 A1* | 9/2002 | Muir et al. | 156/245 |
| 2010/0001010 A1* | 1/2010 | Motegi et al. | 220/694 |
| 2010/0224633 A1* | 9/2010 | Gelardi | 220/315 |
| 2011/0183028 A1* | 7/2011 | Popp et al. | 425/503 |
| 2013/0093125 A1* | 4/2013 | Furey et al. | 264/503 |
| 2013/0125431 A1* | 5/2013 | Brown et al. | 40/299.01 |

\* cited by examiner

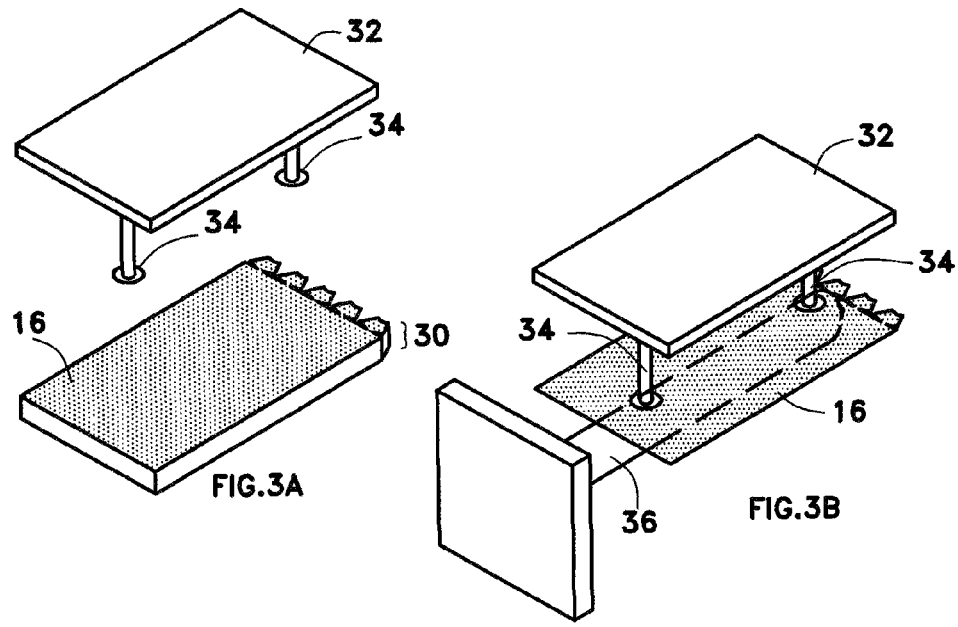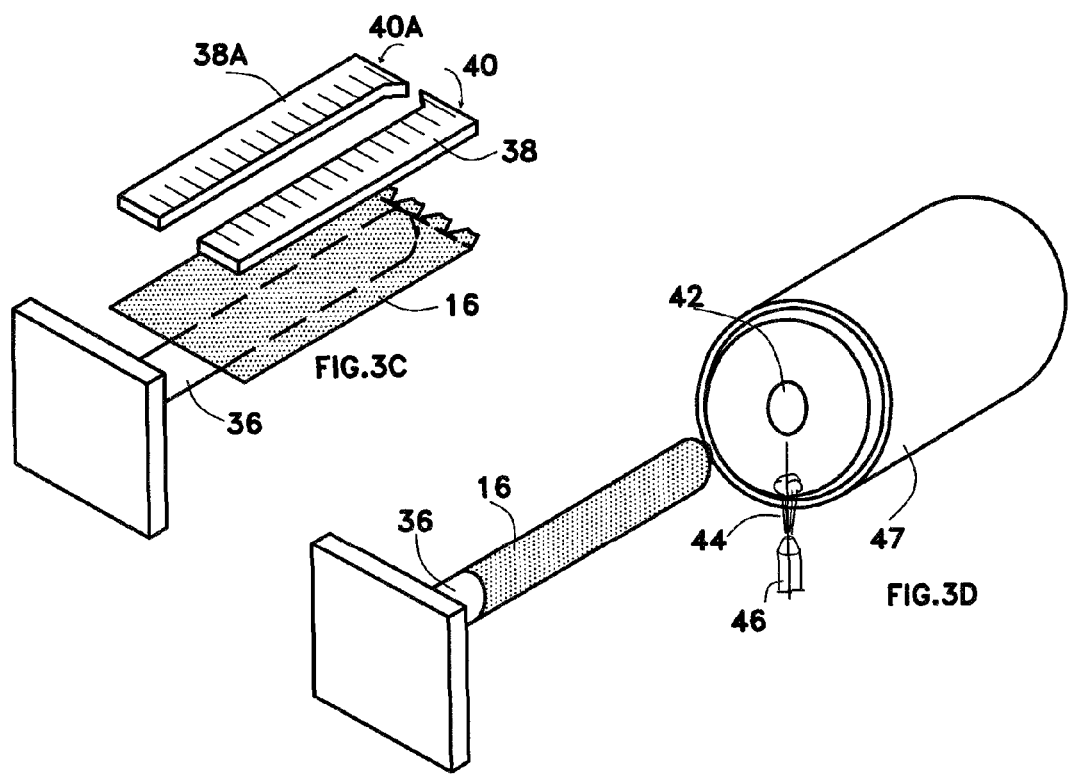

PRODUCT CONTAINER INCLUDING AN IN-MOLD LABEL

BACKGROUND OF THE INVENTION

The present invention pertains to product containers having in-mold labels and a method of manufacturing such containers. An in-mold label for a product container is a label that is adapted for placement into a mold cavity prior to inserting molding material into the mold cavity. The label displays information related to the product.

SUMMARY OF THE INVENTION

The present invention provides a label for a hollow container having a sidewall and a shoulder extending inward from the sidewall; wherein the label displays information related to a product; wherein the label includes a primary segment for covering the sidewall of the container and a plurality of shoulder pads configured by adjacent shoulder pads being spaced apart prior to covering the shoulder so that adjacent shoulder pads can cover the shoulder in at least approximately contiguous alignment with adjacent said shoulder pads when the adjacent shoulder pads cover the shoulder; and wherein the full extent of the label includes a barrier material that impedes one or more particular substances from penetrating through the label.

The present invention further provides a method of inserting an in-mold label for an injection molded product into the mold, comprising the steps of:

(a) inserting the label into a cavity bounded by a cavity mold part; and (b) when one end of the label so extends from the cavity that the lateral edges of the label are not aligned with each other, upon closing the mold, pushing the label fully into the cavity by pushing against the label with a mold part that is moved toward the cavity when the mold is closed so that when the label is fully within the cavity, the lateral edges of the label are aligned with each other.

The present invention still further provides a method of injection molding a layer of a hollow container having a sidewall and an inclined shoulder extending inward from the sidewall, comprising the steps of:

(a) prior to inserting a core mold part into a cavity mold part to thereby provide a mold cavity, inserting an in-mold label into the cavity mold part, wherein the label includes a primary segment for covering the sidewall of the container and a plurality of shoulder pads configured for at least approximately contiguous alignment with adjacent said shoulder pads when the in-mold label is fully inserted into the cavity mold part by adjacent shoulder pads being spaced apart prior to covering the shoulder so that adjacent shoulder pads can cover the shoulder in at least approximately contiguous alignment with adjacent said shoulder pads; and (b) fully inserting the in-mold label into the cavity mold part;

(c) inserting the core mold part into the cavity mold part to compress the shoulder pads of the in-mold label against the portion of the cavity mold part that forms the outer surface of the shoulder of the container to thereby enhance the stability of the position of the core mold relative to the cavity mold part; and (d) injecting molding material into the mold cavity to form the layer of the product container.

Additional features of the present invention are described with reference to the detailed description.

BRIEF DESCRIPTION OF THE DRAWING

FIGS. 3A through 3F illustrates a method of inserting the in-mold label shown in FIG. 2 into a mold cavity.

DETAILED DESCRIPTION

Figure 1:
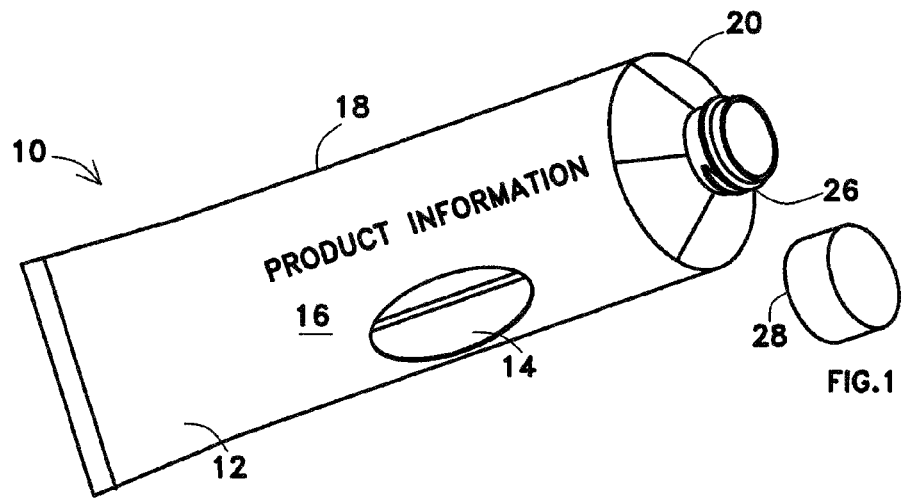
FIG. 1 is a view of an exemplary embodiment of a hollow multi-layered container according to the present invention, together with a cap for the container, wherein a portion of the container is cut away to expose an inner layer of the container.
Figure 2:
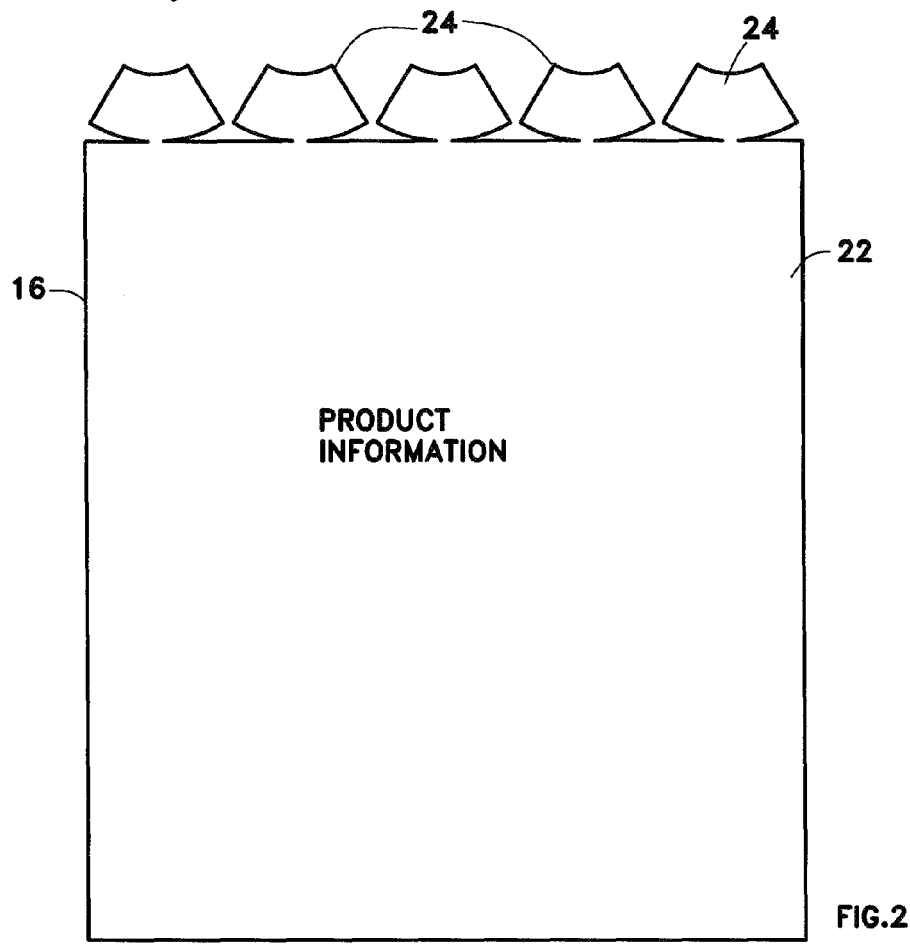
FIG. 2 is a view of an exemplary embodiment of an in-mold label for the container of FIG. 1, with the label being shown as being flat prior to being inserted into a mold cavity.

Referring to FIGS. 1 and 2, an exemplary embodiment of a hollow multi-layered container 10 according to the present invention includes an outer layer 12 and an inner layer 14. The outer layer 12 includes an in-mold label 16. The label 16 has a barrier material that impedes one or more substances that emanate from a product from penetrating through the label 16. The outer surface of the label 16 displays information related to the product.

The inner layer 14 is injection molded while the label 16 is in the mold cavity.

The inner layer 14 and the barrier material included in the in-mold label 16 of the outer layer 12 are substantially coextensive.

The container 10 has a sidewall 18 and an inclined shoulder 20 extending inward from the sidewall 18.

The label 16 includes a primary segment 22 covering the sidewall 18 of the container 10 and a plurality of shoulder pads 24 covering the shoulder 20 of the container 10 in at least approximately contiguous alignment with adjacent shoulder pads 24. The full extent of the label 16 includes the barrier material.

The container 10 has an exterior-threaded neck 26 extending from the shoulder 20. A cap 28 for the container 10 has an interior-threaded sidewall that is dimensioned for enabling the cap 28 to be screwed onto the neck 26 of the container 10 and for contacting the shoulder 20 of the container 10. The cap is molded. The full extent of the cap 28 includes a barrier material that impedes one or more substances that emanate from the product.

The inner layer 14 of the container also functions as a barrier material that impedes substances that emanate from the product. Examples of molding materials that function as barrier materials for impeding particular substances include the following:

EVAL™ EVOH, manufactured by Kuraray America, Inc., which functions as a barrier material for impeding oxygen, moisture, carbon dioxide, nitrogen and helium.

PA MXDX nylon, manufactured by Mitsubishi Gas Chemical Company, which functions as a barrier material for impeding oxygen, moisture and carbon dioxide.

ALATHON types M5010 and M6019, manufactured by Lyondell Basell, which function as a barrier material for impeding oxygen and moisture.

SURPASS type sHDPE, manufactured by Nova Chemicals, which functions as a barrier material for impeding moisture.

BAREX type AN COPOLY, manufactured by Ineos, which functions as a barrier material for impeding oxygen, moisture, carbon dioxide and nitrogen.

OPP BARRIERCOATED FILM type NS3-OPP70, manufactured by Nanoseal, which functions as a barrier material for impeding oxygen and moisture.

SARAN type MA film, manufactured by Dow Chemical, which functions as a barrier material for impeding moisture.

EVAL™ EVOH can also be used as a label material that functions as a barrier material for impeding oxygen, moisture, carbon dioxide, nitrogen and helium.

Aluminum can be used as a label material that functions as a barrier material for impeding most substances. In one embodiment, aluminum foil encased in a plastic material, such as transparent polypropylene, is included in the in-mold label.

A thermoplastic and compatible cyclodextrin derivative, as described in U.S. Pat. No. 6,218,013, which functions as a barrier material for a variety of materials such as moisture, aliphatic or aromatic hydrocarbons, monomer materials, off flavors, toxic compounds etc.

In an alternative embodiment (not shown), the hollow container has a sidewall, but does not have an inclined shoulder extending inward from the sidewall. An outer layer of the container includes a label having an outer surface that displays information related to a product; and the label having a barrier material that impedes one or more particular substances that emanate from the product from penetrating through the label. A molded cap for use with the container of this embodiment extends to the sidewall and includes a barrier material that impedes one or more substances that emanate from the product. In other respects this alternative embodiment of a hollow container has the same features as the hollow container described above with reference to FIGS. 1 and 2.

A method of inserting an in-mold label for an injection molded product into the mold cavity, is described with reference to FIGS. 3A through 3F.

Referring to FIG. 3A, a label 16 is removed from a stack of labels 30 by a robotic arm 32 that includes suction cups 34 for holding the label 16.

Referring to FIG. 3B, the robotic arm 32 moves the label 16 from a position over the stack of labels 30 to a position over a mandrel 36 and deposits the label 16 onto the mandrel 36. There is a partial vacuum inside the mandrel 36 for holding the label 16 on the mandrel 36.

Referring to FIG. 3C, the mandrel 36 is then moved upward between and through a pair of inwardly rotating brushes 38, 38A to cause the label 16 to be wrapped around the mandrel 36. The direction of rotation of the respective brushes 38, 38A is shown by arrows 40 and 40A.

Referring to FIG. 3D, the mandrel 36 is then moved to insert the label 16 into a mold cavity 42. As the label 16 is being inserted into the mold cavity 42, a jet of air 44 is expelled into the mold cavity 42 from a nozzle 46 in order to push the label against the cavity mold part 47 that bounds the mold cavity 42.

Figure 3E:
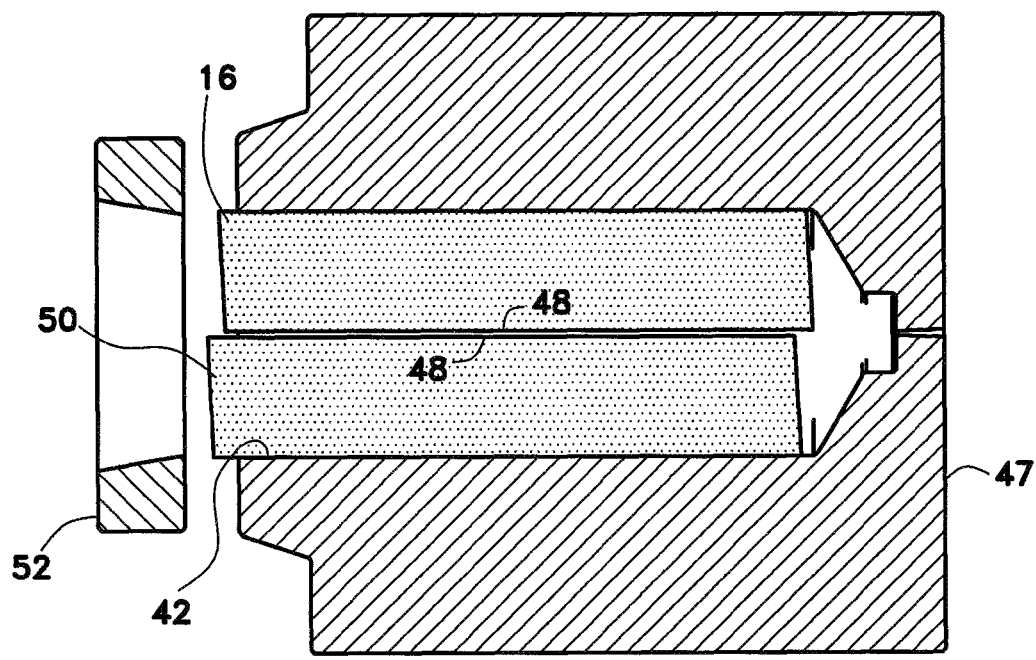
Figure 3F:
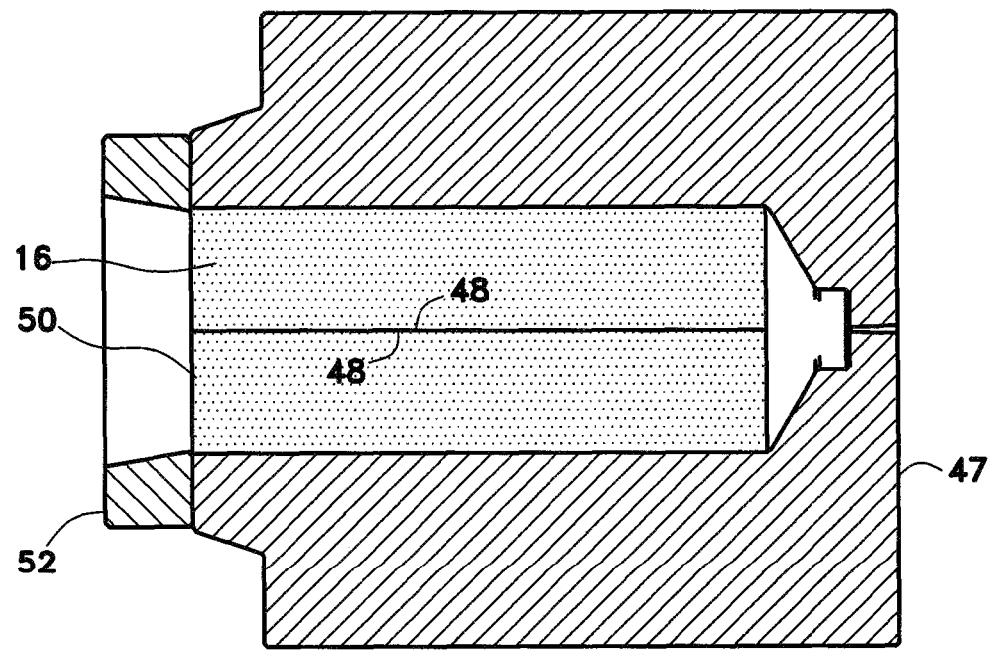

Referring to FIGS. 3E and 3F, in the prior art, when the label 16 has been inserted into the mold cavity 42, the lateral edges 48 of the label 16 are misaligned so as not to be aligned with each other. To overcome such a misalignment, the label 16 is only partially inserted into the mold cavity 42 so that one end 50 of the label 16 extends from the mold cavity 42; and upon closing the mold, pushing the label 16 fully into the mold cavity 42 by pushing against the label 16 with a mold part, such as a stripper ring 52, that is moved toward the mold cavity 42 when the mold is closed so that when the label 16 is fully within the mold cavity 42, the lateral edges 48 of the label 16 are aligned with each other.

Figure 4:
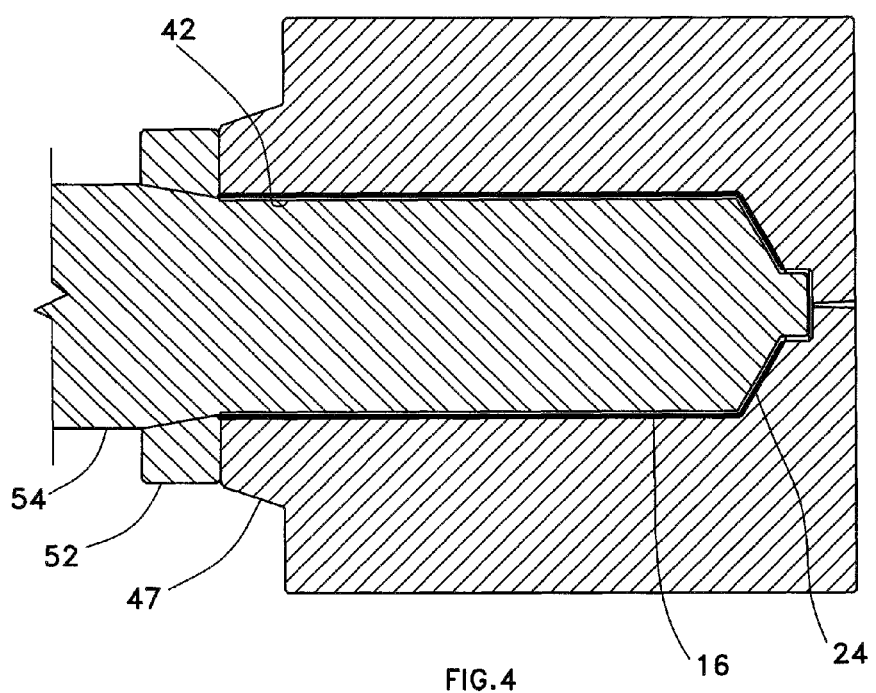
FIG. 4 is a sectional view showing the in-mold label in the mold cavity after the mold core part has been inserted so that molding material can be injected into the mold cavity.

Referring to FIG. 4, after the in-mold label 16 has been fully inserted into the mold cavity 42, a core mold part 54 is inserted into the mold cavity 42 to compress the shoulder pads 24 of the in-mold label 16 against the portion of the cavity mold part 42 that forms the outer surface of the shoulder 20 of the container 10 to thereby enhance the stability of the position of the core mold 54 relative to the cavity mold part 47. The molding material is then injected into the mold cavity 42 to form the inner layer 12 of the product container 10.

In an alternative embodiment (not shown), the container is formed by a molding method other than injection molding after the in-mold label has been inserted into the mold cavity.

In an alternative embodiment (not shown), the label shown in FIG. 2 is applied to a product container as an outer layer of the container after the inner layer of the container has been formed by injection molding, blow molding, glass container manufacture, or some other container manufacturing method.

Another alternative embodiment includes an inner molded layer, an intermediate molded layer and an outer layer. The outer layer includes an in-mold label. The outer surface of the label displays information related to the product. The label has a barrier material that impedes one or more substances that emanate from a product from penetrating through the label. Both the inner layer and the intermediate layer include barrier materials that impede one or more substances that emanate from a product.

The various features of the different embodiments described herein may be combined with one another to the extent that they are not incompatible with one another.

The benefits specifically stated herein do not necessarily apply to every conceivable embodiment of the present invention. Further, such stated benefits of the present invention are only examples and should not be construed as the only benefits of the present invention.

While the above disclosure contains many specificities that may or may not be common to all of the embodiments described herein, these specificities are not to be construed as limitations on the scope of the claimed invention, but rather as examples of the preferred embodiments described herein. For example, the scope of the method claims should not be construed to cover only methods having the steps occur in the sequence recited herein. Other variations are possible and the scope of the present invention should be determined not by the embodiments described herein but rather by the claims and their legal equivalents. The claims require no implicit limitations. Each claim is to be construed explicitly as stated, or by its legal equivalent.

The invention claimed is:

1. A label for a hollow container having a sidewall and a shoulder extending inward from the sidewall;
    wherein the label displays information related to a product;
    wherein the label includes a primary segment for covering the sidewall of the container and a plurality of shoulder pads configured by adjacent shoulder pads being spaced apart prior to covering the shoulder so that adjacent shoulder pads can cover the shoulder in at least approximately contiguous alignment with adjacent said shoulder pads when the adjacent shoulder pads cover the shoulder; and wherein the full extent of the label includes a barrier material that impedes one or more particular substances from penetrating through the label.

2. A label according to claim 1, wherein the label is an in-mold label.

3. A method of inserting an in-mold label for an injection molded product into the mold, comprising the steps of:
 (a) inserting the label into a cavity bounded by a cavity mold part; and
 (b) when one end of the label so extends from the cavity that the lateral edges of the label are not aligned with each other, upon closing the mold, pushing the label fully into the cavity by pushing against the label with a mold part that is moved toward the cavity when the mold is closed so that when the label is fully within the cavity, the lateral edges of the label are aligned with each other.

4. A method of injection molding a layer of a hollow container having a sidewall and an inclined shoulder extending inward from the sidewall, comprising the steps of:
 (a) prior to inserting a core mold part into a cavity mold part to thereby provide a mold cavity, inserting an in-mold label into the cavity mold part, wherein the label includes a primary segment for covering the sidewall of the container and a plurality of shoulder pads configured for at least approximately contiguous alignment with adjacent said shoulder pads when the in-mold label is fully inserted into the cavity mold part by adjacent shoulder pads being spaced apart prior to covering the shoulder so that adjacent shoulder pads can cover the shoulder in at least approximately contiguous alignment with adjacent said shoulder pads; and
 (b) fully inserting the in-mold label into the cavity mold part;
 (c) inserting the core mold part into the cavity mold part to compress the shoulder pads of the in-mold label against the portion of the cavity mold part that forms the outer surface of the shoulder of the container to thereby enhance the stability of the position of the core mold relative to the cavity mold part; and
 (d) injecting molding material into the mold cavity to form the layer of the product container.

* * * * *